US011465504B2

(12) United States Patent
Yasui et al.

(10) Patent No.: US 11,465,504 B2
(45) Date of Patent: Oct. 11, 2022

(54) CONTROL DEVICE, VEHICLE, COMPUTER-READABLE STORAGE MEDIUM, AND CONTROL METHOD

(71) Applicant: HONDA MOTOR CO.,LTD., Tokyo (JP)

(72) Inventors: Yuji Yasui, Saitama (JP); Misako Yoshimura, Saitama (JP); Kentaro Yamada, Saitama (JP); Nanami Tsukamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/174,363

(22) Filed: Feb. 12, 2021

(65) Prior Publication Data
US 2021/0252982 A1 Aug. 19, 2021

(30) Foreign Application Priority Data
Feb. 19, 2020 (JP) .............................. JP2020-025927

(51) Int. Cl.
*B60K 37/02* (2006.01)
*B60W 50/14* (2020.01)
*B60W 60/00* (2020.01)

(52) U.S. Cl.
CPC .............. *B60K 37/02* (2013.01); *B60W 50/14* (2013.01); *B60W 60/0053* (2020.02); *B60K 2370/1529* (2019.05); *B60K 2370/164* (2019.05); *B60K 2370/166* (2019.05); *B60K 2370/169* (2019.05); *B60K 2370/195* (2019.05); *B60W 2050/146* (2013.01)

(58) Field of Classification Search
CPC ............ B60K 37/02; B60K 2370/1529; B60K 2370/195; B60K 2370/166; B60K 2370/169; B60K 2370/164; B60W 60/0053; B60W 50/14; B60W 2050/146
See application file for complete search history.

(56) References Cited

U.S. PATENT DOCUMENTS

| | | | |
|---|---|---|---|
| 6,545,663 B1 * | 4/2003 | Arbter ................... | G06F 3/0425 345/158 |
| 10,592,916 B1 * | 3/2020 | DeLorean .............. | G08G 1/052 |
| 10,802,210 B2 * | 10/2020 | Singhal .................... | F21K 9/61 |

(Continued)

FOREIGN PATENT DOCUMENTS

| | | | | |
|---|---|---|---|---|
| CN | 108875658 A | * | 11/2018 | ......... G06K 9/00805 |
| DE | 102011083184 A1 | * | 3/2012 | ............... B60R 1/00 |

(Continued)

*Primary Examiner* — Chico A Foxx

(57) ABSTRACT

A control device controls a display device capable of displaying visual information for a passenger of a moving body, in two or more display regions. The control device causes adjacent target regions of the display regions to change from a display state in which the information is displayed to a display restricted state in which display is restricted, according to a predetermined order, when a predetermined condition is satisfied. The control device determines the target regions and the order, based on a traveling direction of the moving body at the time when the condition is satisfied or a traveling direction of the moving body that is predicted after the time when the condition is satisfied.

17 Claims, 11 Drawing Sheets

(56) References Cited

U.S. PATENT DOCUMENTS

| | | | | |
|---|---|---|---|---|
| 2008/0129684 A1* | 6/2008 | Adams | ............... | B60K 35/00 |
| | | | | 345/55 |
| 2009/0037278 A1* | 2/2009 | Cohen | ............... | G06Q 40/12 |
| | | | | 382/311 |
| 2011/0025489 A1* | 2/2011 | Shimoda | ............... | B60R 1/00 |
| | | | | 340/459 |
| 2013/0150004 A1* | 6/2013 | Rosen | ............... | H04M 3/42357 |
| | | | | 455/418 |
| 2014/0343849 A1* | 11/2014 | Ohzawa | ............... | G08G 1/096866 |
| | | | | 701/537 |
| 2015/0325052 A1* | 11/2015 | Kuehne | ............... | H04N 5/272 |
| | | | | 345/633 |
| 2016/0059864 A1* | 3/2016 | Feit | ............... | H04M 1/6075 |
| | | | | 701/36 |
| 2017/0161009 A1* | 6/2017 | Ogisu | ............... | G06F 3/1446 |
| 2017/0313248 A1* | 11/2017 | Kothari | ............... | B60R 1/00 |
| 2018/0211414 A1* | 7/2018 | Cronin | ............... | G06T 11/00 |
| 2018/0350236 A1* | 12/2018 | Yamaguchi | ............... | G08G 1/04 |
| 2019/0241198 A1* | 8/2019 | Mori | ............... | B60W 40/105 |
| 2021/0056934 A1 | 2/2021 | Horihata et al. | | |
| 2021/0129860 A1* | 5/2021 | Lee | ............... | B60K 35/00 |

FOREIGN PATENT DOCUMENTS

| | | | | |
|---|---|---|---|---|
| DE | 112015004431 T5 | * | 6/2017 | ............ B60K 35/00 |
| EP | 2647520 A1 | * | 10/2013 | ............ B60K 37/06 |
| EP | 2650164 A1 | * | 10/2013 | ............ B60K 37/06 |
| EP | 3330151 A1 | * | 6/2018 | ............ B60K 35/00 |
| JP | 2019206255 A | | 12/2019 | |
| JP | 2021178635 A | * | 11/2021 | ............ B60K 35/00 |
| WO | WO-2013046423 A1 | * | 4/2013 | ............ B60K 35/00 |
| WO | WO-2013046425 A1 | * | 4/2013 | ............ B60K 35/00 |
| WO | WO-2019230270 A1 | * | 12/2019 | ............ B60K 35/00 |
| WO | WO-2019230271 A | * | 12/2019 | ............ B60R 1/00 |
| WO | WO-2019230272 A1 | * | 12/2019 | ............ B60K 35/00 |

\* cited by examiner

|410

| 400[1][1] | 400[1][2] | 400[1][3] | 400[1][4] | 400[1][5] | 400[1][6] | 400[1][7] | 400[1][8] |
| --- | --- | --- | --- | --- | --- | --- | --- |
| 400[2][1] | 400[2][2] | 400[2][3] | 400[2][4] | 400[2][5] | 400[2][6] | 400[2][7] | 400[2][8] |
| 400[3][1] | 400[3][2] | 400[3][3] | 400[3][4] | 400[3][5] | 400[3][6] | 400[3][7] | 400[3][8] |
| 400[4][1] | 400[4][2] | 400[4][3] | 400[4][4] | 400[4][5] | 400[4][6] | 400[4][7] | 400[4][8] |

FIG. 4

| TRANSITION CONDITION | TRAVELING DIRECTION | TRANSITION ORDER | CHARACTER IMAGE | MOTION IMAGE | DISPLAY POSITION |
|---|---|---|---|---|---|
| •THE VEHICLE IS STOPPED •THE TRAFFIC SIGNAL LIGHT CHANGES FROM RED TO BLUE | TO THE RIGHT | FROM RIGHT TO LEFT |  | SUCK | LOWER LEFT |
| | TO THE LEFT | FROM LEFT TO RIGHT |  | SUCK | LOWER RIGHT |
| | STRAIGHT TRAVELING | FROM UPPER TO LOWER |  | EAT | UPPER |
| •THE VEHICLE IS TRAVELING ON THE HIGHWAY •THE AUTOMATIC DRIVING LEVEL IS LOWERED FROM 3 TO 2 | STRAIGHT TRAVELING | FROM UPPER TO LOWER |  | EAT | UPPER |
| A FIRE-EXTINGUISH-ING VEHICLE IS APPROACHING | * | FROM LEFT TO RIGHT |  | YELL | RIGHT |
| . . . | . . . | . . . | . . . | . . . | . . . |

FIG. 8

| VEHICLE SPEED v [km/h] | TRANSITION RATE |
|---|---|
| 0 | RATE 1 |
| $0 < v \leq 40$ | RATE 2 |
| $40 < v \leq 70$ | RATE 3 |
| $70 < v$ | RATE 4 |

FIG. 9

CONTROL DEVICE, VEHICLE, COMPUTER-READABLE STORAGE MEDIUM, AND CONTROL METHOD

CROSS REFERENCE TO RELATED APPLICATION

The contents of the following Japanese patent application are incorporated herein by reference,
Japanese Patent Application NO. 2020-025927 filed on Feb. 19, 2020.

BACKGROUND

1. Technical Field

The present invention relates to a control device, a vehicle, a computer-readable storage medium, and a control method.

2. Related Art

Patent Document 1 discloses that "a display control device that controls display of a virtual image (Vi) superimposed on a superimposition target in a foreground of a passenger comprises a condition determination unit (74) that determines whether a predetermined interruption condition is satisfied, and a display control unit (76) that interrupts the display of the virtual image when the condition determination unit determines that the interruption condition is satisfied".

CITATION LIST

Patent Document
Patent Document 1: Japanese Patent Application Publication No. 2019-206255

BRIEF DESCRIPTION OF THE DRAWINGS

FIG. 4 pictorially shows display regions of the display device 11.
FIG. 8 shows a data structure of non-display change information.
FIG. 9 shows a data structure of change rate information.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
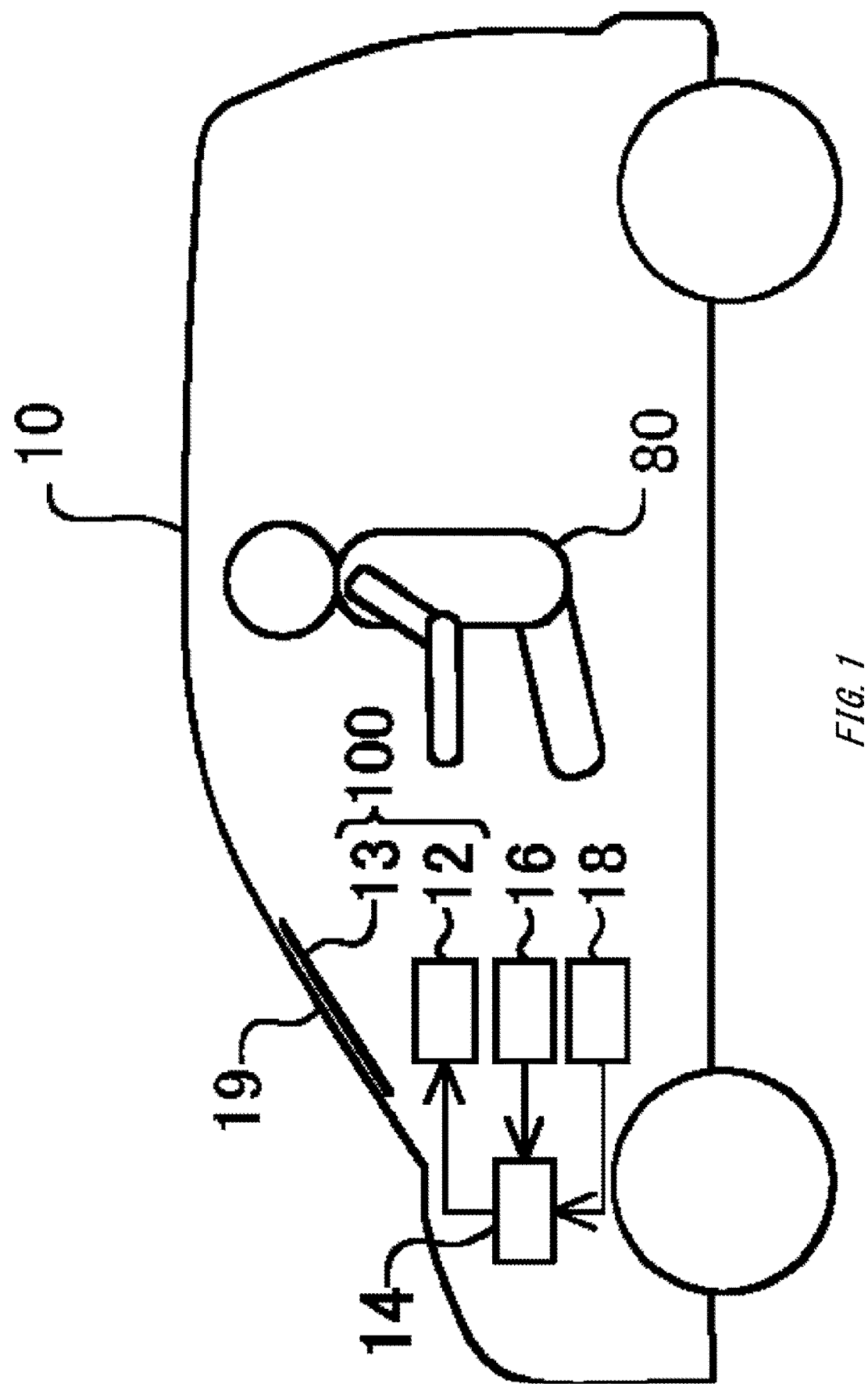
FIG. 1 schematically shows a configuration of a vehicle 10.

FIG. 1 schematically shows a configuration of a vehicle 10. The vehicle 10 is a transportation vehicle such as an automobile, for example.

The vehicle 10 comprises a display device 11, a control device 14, a sensor 16, an ECU 18, and a windshield 19.

The display device 11 includes a head up display device (HUD device 12), and a reflection part 13 provided on the windshield 19. The HUD device 12 is provided below the windshield 19. The HUD device 12 projects visible light to the reflection part 13. The control device 14 causes the HUD device 12 to project the visible light including image information to the reflection part 13. Thereby, a passenger 80 in the vehicle 10 can visually recognize a virtual image that is formed by the visible light projected by the HUD device 12, as a display image through the windshield 19. Note that, in the present embodiment, an image that is visually recognized by the passenger 80 as the HUD device 12 projects the visible light is referred to as a "display image" for the purpose of preventing the description from being redundant. It is also described that the display device 11 displays the "display image".

The ECU 18 is an electric control unit that controls the vehicle 10. The ECU 18 controls automatic driving or assistance driving of the vehicle 10. For example, the ECU 18 collectively controls steering, braking, acceleration, deceleration and the like of the vehicle 10. The sensor 16 collects information inside and outside of the vehicle. Specifically, the sensor 16 includes cameras that collect image information outside of the vehicle and image information inside of the vehicle. The sensor 16 includes microphones that collect voice information outside of the vehicle and voice information inside of the vehicle.

The control device 14 controls the display image that is displayed by the display device 11, based on the information acquired from the ECU 18 and the voice information and image information collected by the sensor 16.

Figure 2:
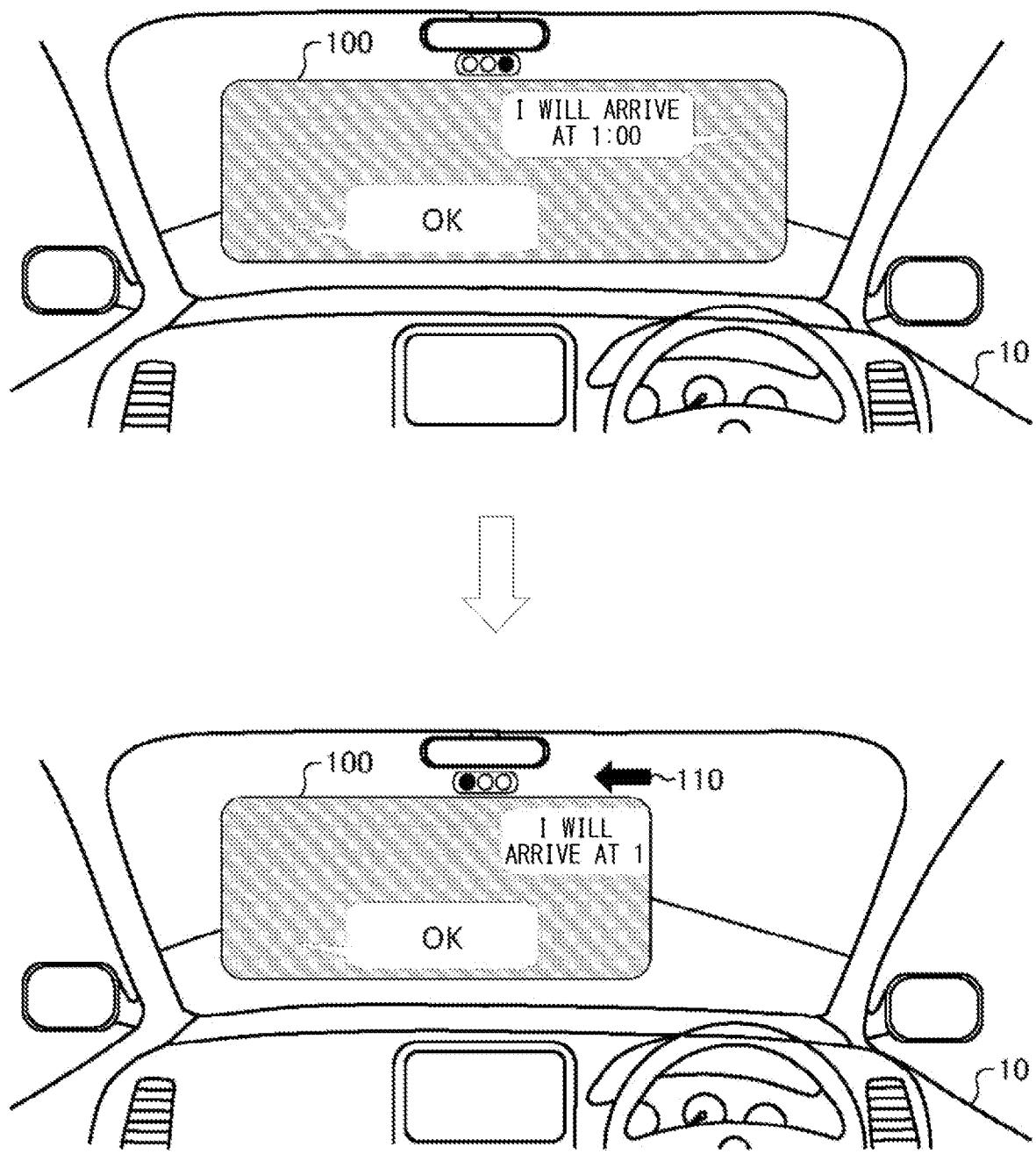
FIG. 2 schematically shows a display image that is displayed by a display device 11.

FIG. 2 schematically shows a display image that is displayed by the display device 11. When a signal of a traffic signal light in front of the vehicle 10 is a traveling disallowed display (for example, a red light signal) and the vehicle 10 is stopped, the control device 14 causes the display device 11 to display a display image 100. The display image 100 is a display image of an SNS (Social Network Service) application, for example. For example, the control device 14 generates text information from the voice information of the passenger 80 collected by the sensor 16, and outputs a message based on the text information to the SNS application to update the display image 100. When a message addressed to the passenger 80 is acquired, the control device 14 outputs the message to the SNS application to update the display image 100. Thereby, when the vehicle 10 is stopped, the passenger 80 can talk to other persons through the SNS application.

When the signal of the traffic signal light in front of the vehicle 10 changes to a traveling allowed display (for example, a blue light signal), the control device 14 causes the display image 100 to change to a non-display state. At this time, when the vehicle 10 is scheduled to turn right, the control device 14 causes the display image to change to the non-display state in order from the right to the left with respect to a traveling direction of the vehicle 10, as shown with an arrow 110. On the other hand, when the vehicle 10 is scheduled to turn left, the control device 14 causes the display image 100 to change to the non-display state in order from the left to the right with respect to the traveling direction of the vehicle 10. Thereby, the control device 14 can first cause a region, in which the vehicle 10 is going to travel, to change to the non-display state.

Figure 3:
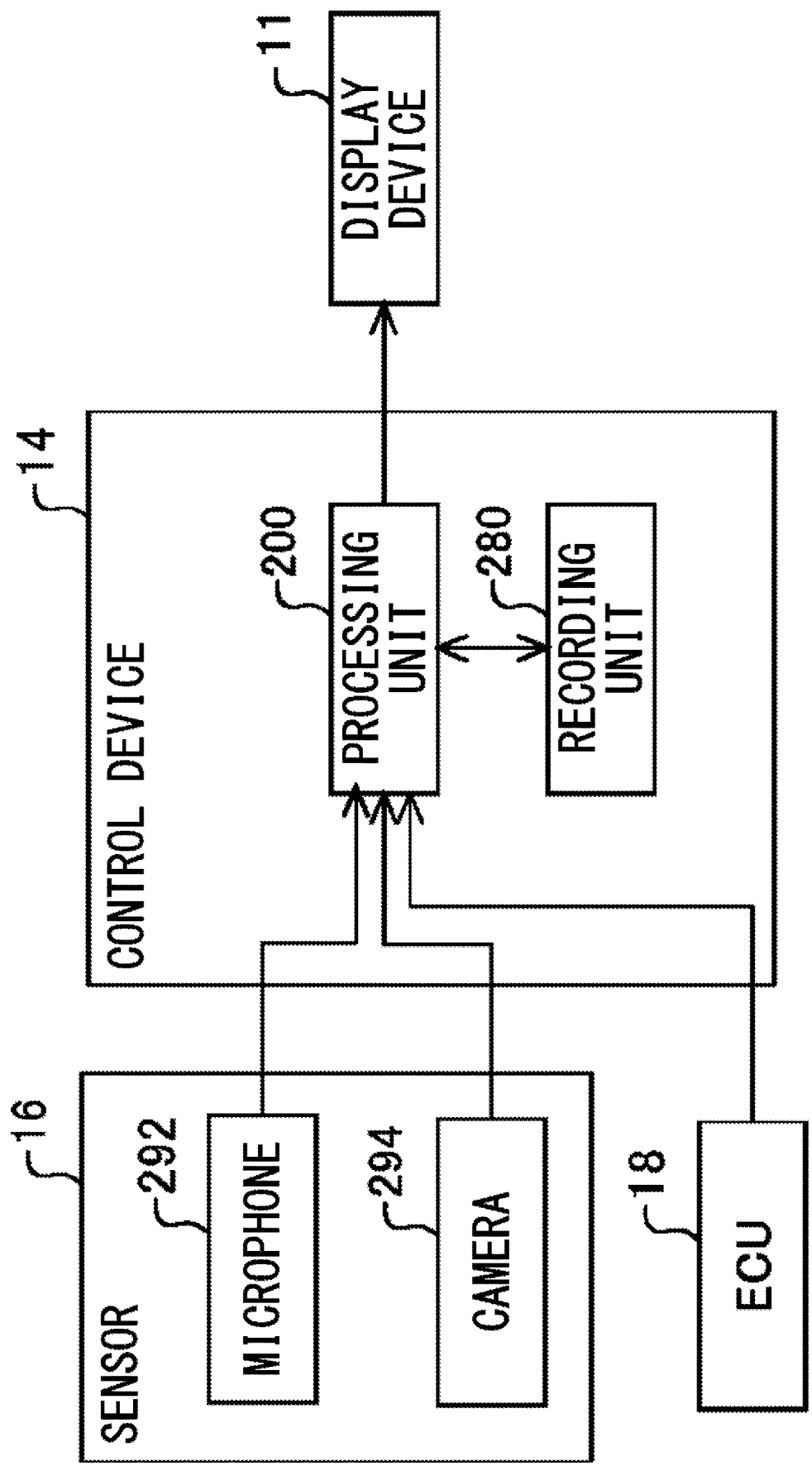
FIG. 3 shows an entire configuration of a system comprising a control device 14, a sensor 16, the display device 11, and an ECU 18.

FIG. 3 shows an entire configuration of a system comprising the control device 14, the sensor 16, the display device 11, and the ECU 18. The sensor 16 includes a microphone 292 and a camera 294.

The microphone 292 generates voice information, based on voice uttered by the passenger 80. The microphone 292 also acquires voice outside of the vehicle to generate voice information. The camera 294 captures the passenger 80 in the vehicle 10 to generate image information of the passenger 80. The camera 294 also captures an outside of the vehicle 10 to generate image information outside of the vehicle. The passenger 80 is a person who is in the vehicle 10. For example, the passenger 80 may be a driver of the vehicle 10. The passenger 80 may also be a person other than the driver of the vehicle 10.

The control device 14 comprises a processing unit 200, and a recording unit 280. The processing unit 200 is implemented by an arithmetic processing device including a processor, for example. The recording unit 280 is implemented including a non-volatile storage medium. The processing unit 200 performs processing by using information stored in the recording unit 280.

The display device 11 is a head up display. The display device 11 superimposes and displays information on a scene that is visually recognized by the passenger. The display device 11 can display visual information for the passenger in the vehicle 10, in two or more display regions. The display device 11 is controlled by the control device 14. For example, the display device 11 displays the display image of the SNS application and the like, according to an instruction of the control device 14. Note that, the control device 14 has a function of generating the image information of the SNS application and the like, and may cause the display device 11 to display the image information generated by the control device 14. The control device 14 may also acquire the image information of the SNS application and the like from a mobile terminal possessed by the passenger 80 or an external server, and cause the display device 11 to display the image information acquired from the mobile terminal or the external server.

The control device 14 controls a display state of the display image that is displayed by the display device 11. Specifically, when a predetermined condition is satisfied, the processing unit 200 causes adjacent target regions of display regions of the display device 11 to change from a display state in which information is displayed to a display restricted state in which display is restricted, according to a predetermined order. Note that, in the present embodiment, for easy understanding, the "predetermined condition" is referred to as a "change condition". The processing unit 200 determines a target region and an order, based on a traveling direction of the vehicle 10 at the time when the change condition is satisfied or a predicted traveling direction of the vehicle 10 after the time when the change condition is satisfied.

An example of the "display restricted state" is a non-display state in which a display image is not displayed. The "display restricted state" may also be a state in which a light intensity of the display image is lower than a light intensity of the display image in a display unrestricted state in which display is not restricted. For example, the "display restricted state" may be a state in which a transmittance of the display image is made higher than a transmittance of the display image in the display unrestricted state. The "display restricted state" may also be a state in which an area occupied by the display image is smaller than an area occupied by the display image in the display unrestricted state.

The recording unit 280 may record character images associated with each of a plurality of combinations of target regions and orders. The processing unit 200 may also acquire a character image associated with a combination of the determined target region and order from the recording unit 280, and cause the display device 11 to display the character image.

The recording unit 280 may also record display positions of the character images associated with each of the plurality of combinations. The processing unit 200 may also acquire a display position of a character image associated with a combination of the determined target region and order from the recording unit 280. The processing unit 200 may display the acquired character image at a display position in the display device, which is associated with the combination of the determined target region and order. For example, the processing unit 200 may display the acquired character image at a display position associated with the combination of the determined target region and order.

The recording unit 280 may also record motion images of characters associated with each of the plurality of combinations. The processing unit 200 may also acquire a motion image of a character associated with a combination of the determined target region and order from the recording unit 280. The processing unit 200 may cause the display device 11 to display the acquired motion image of the character.

The recording unit 280 may also record character images associated with each of a plurality of change conditions. The processing unit 200 may also acquire a character image associated with the satisfied change condition from the recording unit 280. The processing unit 200 may cause the display device 11 to display the acquired character image.

The processing unit 200 determines a change rate from the display state to the display restricted state, based on a speed of the vehicle 10. For example, the processing unit 200 increases a change rate from the display state to the display restricted state as the vehicle 10 travels faster.

When it is predicted that the traveling direction of the vehicle 10 will change, the processing unit 200 determines a change order to the display restricted state in order from a display region corresponding to the predicted traveling direction of the vehicle 10 to a display region in a direction opposite to the predicted traveling direction of the vehicle 10. When the vehicle 10 is moving at a speed higher than a predetermined speed, the processing unit 200 also determines a change order to the display restricted state in order from an upper display region to a lower display region with respect to a surface on which the vehicle 10 moves.

The change condition may also include change of the vehicle 10 from a stop state to a moving state. In a case where the vehicle 10 can drive automatically, the change condition may include lowering in automatic driving level. Note that, as the automatic driving level, at least one index of level 1 (driving assistance) to level 5 (full automatic driving) of SAEJ3016 defined by SAE international can be applied.

FIG. 4 pictorially shows display regions of the display device 11. In the present embodiment, a displayable region 410 may be a region in which the reflection part 13 is provided. In connection with FIG. 4, the displayable region 410 is described as including 32 display regions 400 of 4 rows and 8 columns. As shown, the 32 display regions 400 are each identified by denoting a display region 400[*i*] [*j*]. Herein, i is an integer of 1 or greater indicating a row, and j is an integer of 1 or greater indicating a column.

Figure 5:
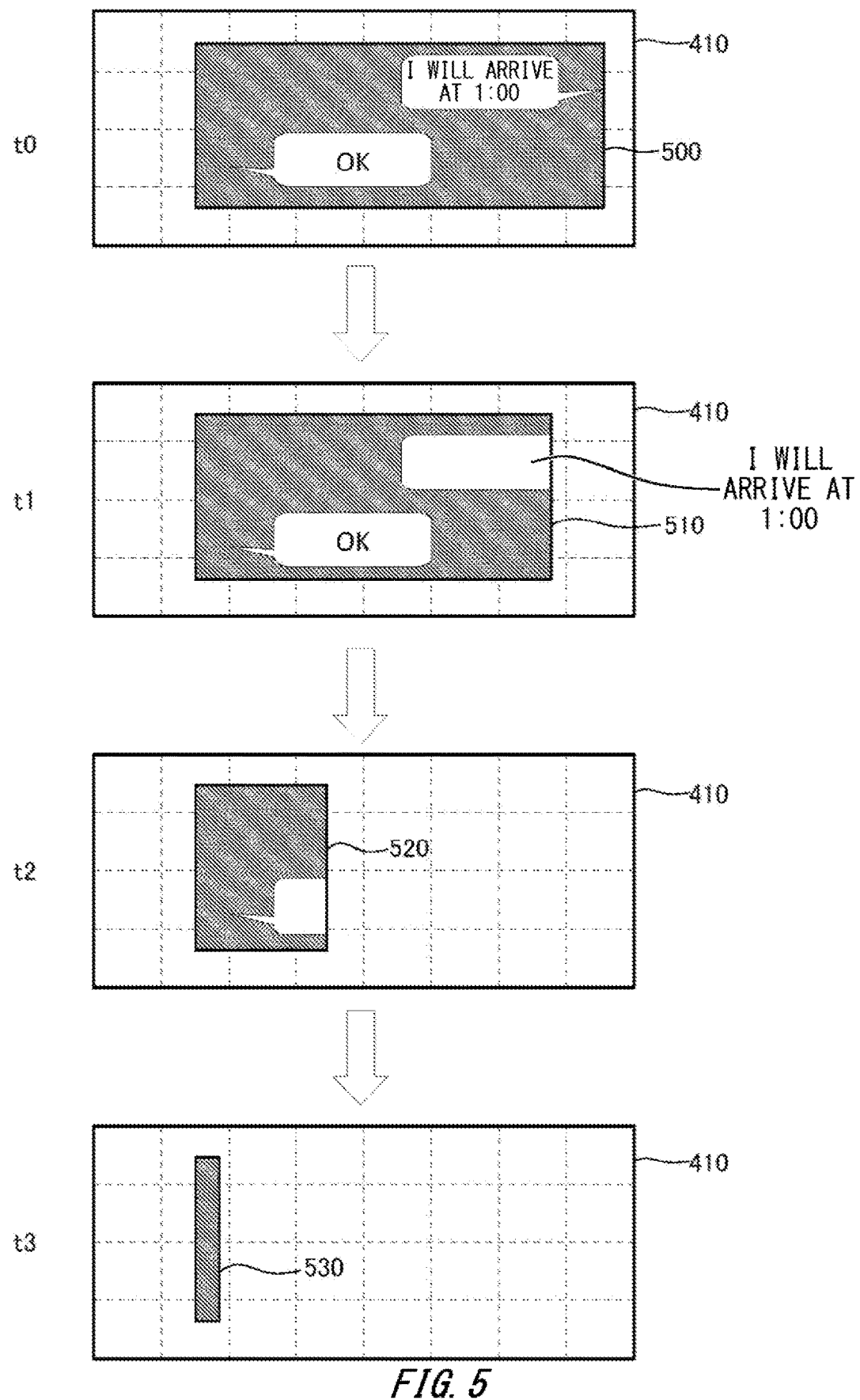
FIG. 5 pictorially shows an aspect where a processing unit 200 causes the display regions to change to a non-display state.

FIG. 5 pictorially shows an aspect where the processing unit 200 causes the display regions to change to a non-display state. At time t0, a display image 500 is displayed in a display region 400[*i*] [2], a display region 400[*i*] [3], a display region 400[*i*][4], a display region 400[*i*] [5], a display region 400[*i*] [6], a display region 400[*i*] [7], and a display region 400[*i*] [8]. Here, i is any integer from 1 to 4.

It is assumed that at time t0, the vehicle 10 is in a stop state according to a traveling disallowed display of a traffic signal light. When a signal display of the front traffic signal light changes to a traveling allowed display (blue light signal), the processing unit 200 determines that the vehicle 10 will turn right. For example, in a case where a traveling route based on a vehicle destination is preset in the vehicle 10, the processing unit 200 determines that the vehicle will turn right according to the set traveling route. The processing unit 200 may also determine that the vehicle 10 will turn right, based on an operating state of a direction indicator. The processing unit 200 may also determine that the vehicle 10 will turn right, based on steering operation information of the vehicle 10.

At time t0, when it is determined that the signal display of the traffic signal light changes to the traveling allowed display, based on the image information generated in the camera 294 or traffic signal information transmitted from the traffic signal light, the processing unit 200 determines an order of causing the display image 500 to change to the non-display state, in order of the display region 400[*i*][8], the display region 400[*i*] [7], the display region 400[*i*] [6], the display region 400[*i*] [5], the display region 400[*i*] [4], the display region 400[*i*] [3] and the display region 400[*i*] [2]. The processing unit 200 causes each of the display regions 400 to change to the non-display state in the corresponding order, thereby causing the display image 500 to change to the non-display state in order from the right display region to the left display region with respect to the traveling direction of the vehicle 10 from time t0 to time t3. Thereby, as shown with a display image 510, a display image 520, and a display image 530 of FIG. 5, the display image 500 becomes the non-display state in order from the right display region.

In this way, the processing unit 200 causes the adjacent display regions 400 of the display regions 400 of the display device 11 to change from the display state in which a display image is displayed to the non-display state in which display is restricted. At this time, the processing unit 200 determines a change order to the non-display state in order from the display region 400 corresponding to the predicted traveling direction of the vehicle 10 to the display region 400 in the direction opposite to the predicted traveling direction of the vehicle 10. Thereby, it is possible to cause the display region in a direction in which the vehicle 10 is about to travel from now to change to the non-display state earlier than the display region in the opposite direction.

Figure 6:
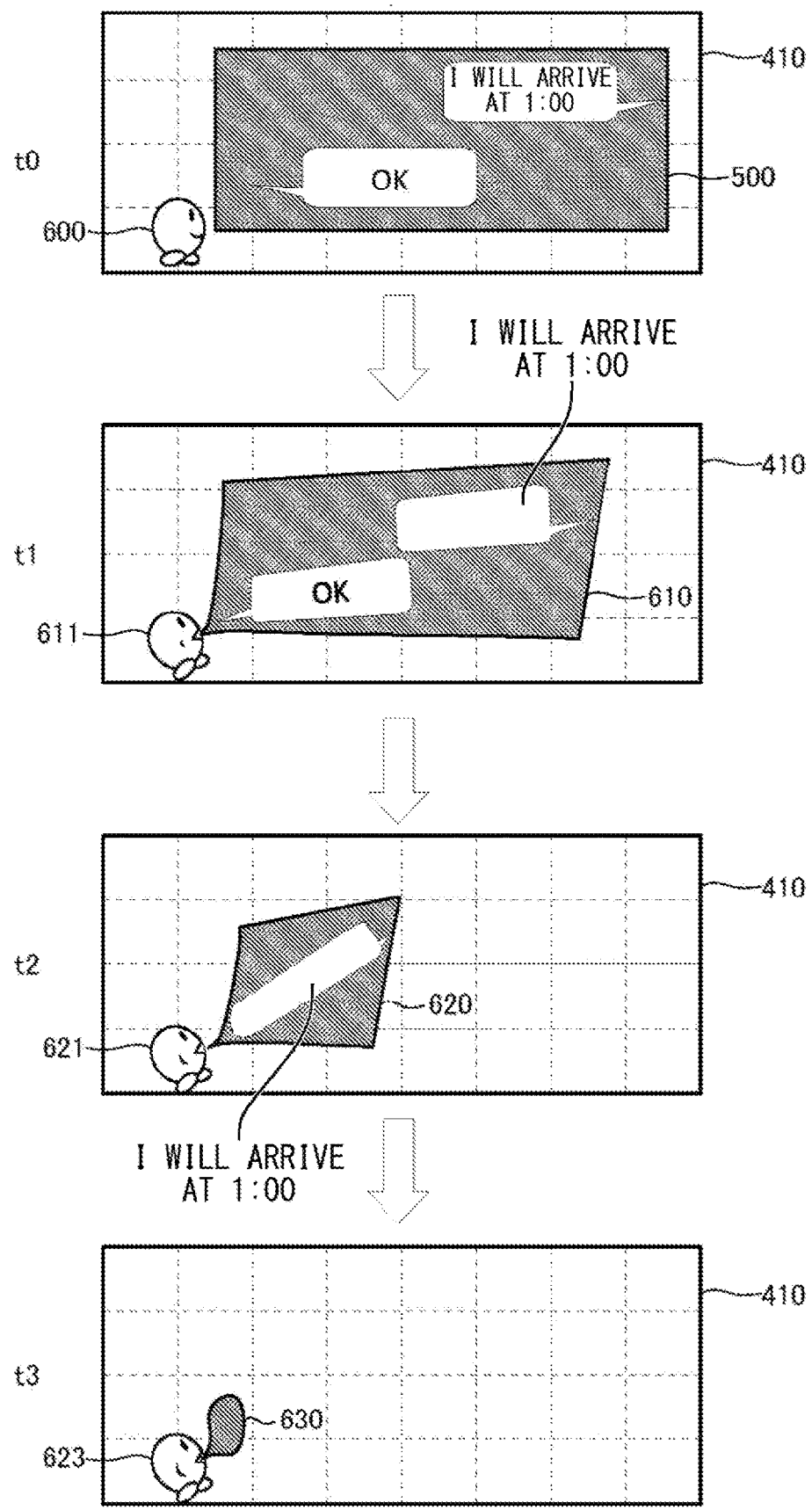
FIG. 6 pictorially shows another example of effecting change to the non-display state in order from the right to the left.

FIG. 6 pictorially shows another example of effecting change to the non-display state in order from the right to the left. At time t0, the display state of each of the display regions 400 is the same as the display state at time t0 shown in FIG. 5.

When effecting change to the non-display state in order from the right display region to the left display region with respect to the traveling direction of the vehicle 10, the processing unit 200 displays a character 600 at a left lower part of the display image 500. The character 600 is a character that makes a motion as if it sucks the display image 500 by a mouth. The processing unit 200 causes the display device 11 to display a motion image 611, a motion image 621 and a motion image 623 as if the character 600 sucks the display image 500 by a mouth, and also causes the display device 11 to display a display image 610, a display image 620 and a display image 630 as if the display image 500 is sucked into the mouth of the character 600. Thereby, the processing unit 200 causes the display image 500 to change to the non-display state in order from the right display region to the left display region.

Figure 7:
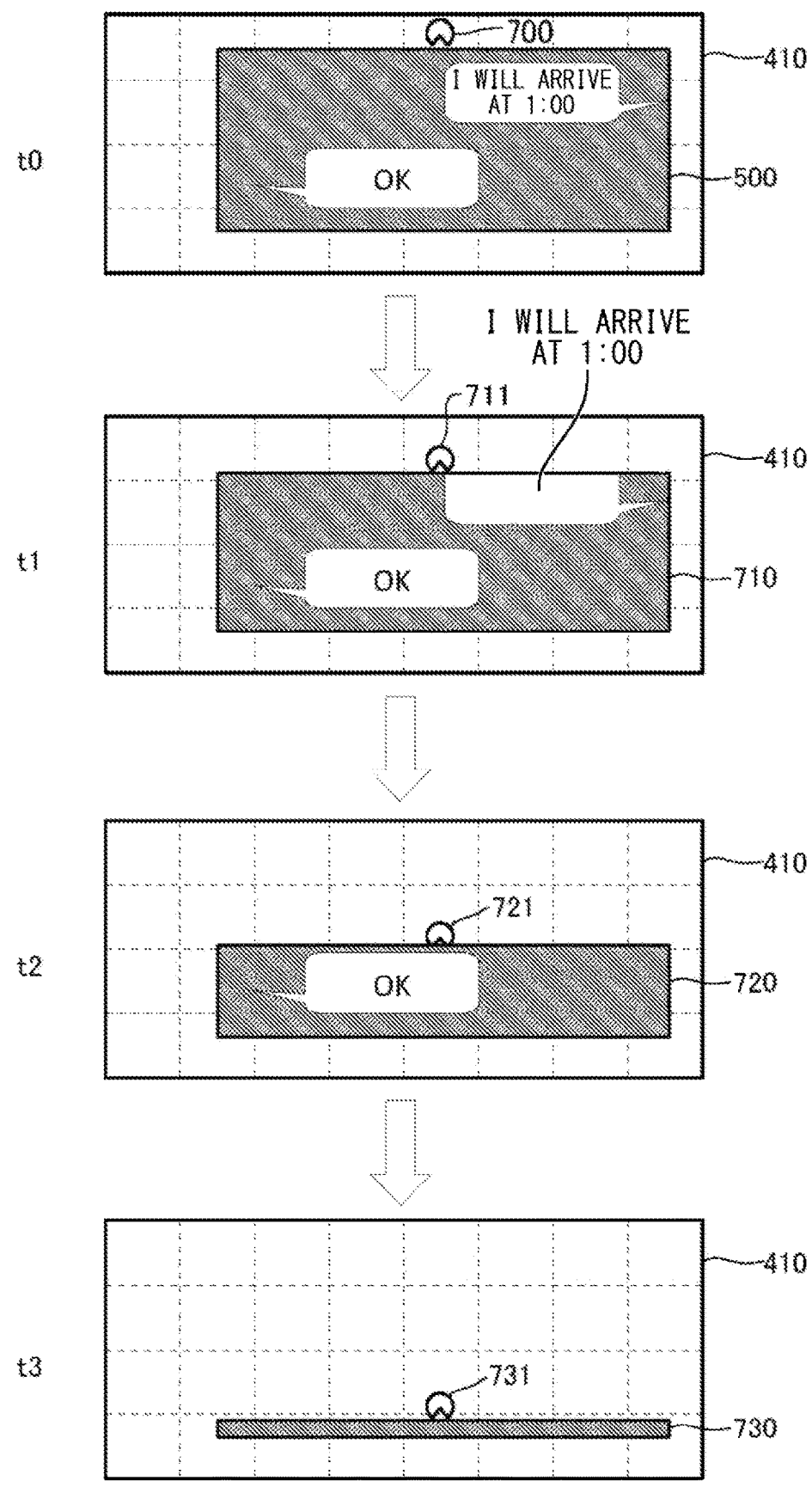
FIG. 7 pictorially shows another example of effecting change to the non-display state in order from the upper to the lower.

FIG. 7 pictorially shows another example of effecting change to the non-display state in order from the upper to the lower. At time t0, the display state of each of the display regions 400 is the same as the display state at time t0 shown in FIG. 5. In the example shown in FIG. 7, it is assumed that the vehicle 10 displays the display image 500 during traveling on the highway at the automatic driving level 3.

Herein, when a signal, which indicates that the automatic driving level of the vehicle 10 may be lowered from the automatic driving level 3 to the automatic driving level 2, is received from the ECU 18, the processing unit 200 determines change to the non-display state in order from the upper display region to the lower display region with respect to the traveling surface of the vehicle 10.

When effecting the change to the non-display state in order from the upper display region to the lower display region, the processing unit 200 displays a character 700 above the display image 500. The character 700 is a character that makes a motion as if it eats the display image 500. The processing unit 200 causes the display device 11 to display a motion image 711, a motion image 721 and a motion image 731 as if the character 700 eats the display image 500 from the upper, and also causes the display device 11 to display a display image 710, a display image 720 and a display image 730 as if the display image 500 is eaten by the character 700. Thereby, the processing unit 200 causes the display image 500 to change to the non-display state in order from the upper display region to the lower display region.

Note that, in FIGS. 4 to 7, for easy understanding of the change of the display state, the case where the displayable region includes the 32 display regions 400 has been exemplified. However, the "display region" may also be a fine region. For example, the "display region" may be a region occupied by one pixel element of a plurality of pixel elements provided to a display. The "display region" may also be a region occupied by a bright point formed based on one pixel information configuring the image information.

FIG. 8 shows a data structure of non-display change information. The non-display change information associates a change condition, a traveling direction, a change order, a character image, motion information, and a display position each other.

In the "change condition", information indicative of a condition that should be satisfied when causing a display image to change to the non-display state is stored. FIG. 8 shows a condition of "the vehicle is at the stop" and "the traffic signal light changes from red to blue", a condition of "the vehicle is traveling on the highway" and "the automatic driving level is lowered from 3 to 2" and a condition of "the emergency car is approaching", as examples of the "change condition".

In the "traveling direction", information indicative of a traveling direction of the vehicle 10 is stored. The "traveling direction" is a current traveling direction of the vehicle 10 or a predicted traveling direction of the vehicle 10. FIG. 8 shows "to the right", "to the left" and "straight-traveling", as examples of the "traveling direction". "To the right" includes a right turn of the vehicle 10, movement of the vehicle 10 to the right lane and the like. "To the left" includes a left turn of the vehicle 10, movement of the vehicle 10 to the left lane and the like. "To the left" includes a case where the vehicle 10 is caused to move to the left side road. "To the right" includes a case where the vehicle 10 is caused to move to the right side road.

In the "change order", information indicative of an order of causing the display region to change to the non-display state is stored. "From right to left" indicates change to the non-display state from the right display region to the left display region with respect to the traveling direction of the vehicle 10. "From left to right" indicates change to the non-display state from the left display region to the right display region with respect to the traveling direction of the vehicle 10. "From upper to lower" indicates change to the non-display state from the upper display region to the lower display region with respect to the traveling direction of the vehicle 10.

In the "character", information indicative of image data of a character is stored. In the "motion image", moving image information indicative of a motion of a character is stored. The "motion image" is a moving image in which the character 600 shown in FIG. 6 makes a motion of sucking a display image, a moving image in which the character 700 shown in FIG. 7 makes a motion of eating a display image, and the like, for example.

In the "display position", a position at which a character is displayed is stored. In the example of FIG. 8, "right lower" or "left lower" of the displayable region 410 is associated with the display position of the character 600, according to the traveling direction of the vehicle 10. "Upper" of the displayable region 410 is also associated with the display position of the character 700.

The processing unit 200 refers to the change information to determine a change order to the non-display state, a character to be displayed on the display device 11, a motion image of the character and a display position of the character, based on a satisfied change condition. For example, when it is determined that the change condition of the "vehicle is traveling on the highway" and "the automatic driving level changes from 3 to 2" is satisfied, the processing unit 200 displays the character 700 above the displayable region 410 of the display device 11 if the vehicle 10 is traveling straight. Then, as shown in FIG. 7, the processing unit 200 causes the display image to change to the non-display state from the upper to the lower. Thereby, when the vehicle 10 is moving at high speed, it is possible to cause the display image to change to the non-display state from the upper to the lower with respect to the road surface of the road.

As another example, when it is determined that the change condition of "the vehicle is at the stop" and "the traffic signal light changes from red to blue" is satisfied, the processing unit 200 displays the character 600 on the right lower or left lower of the displayable region 410 of the display device 11, according to the predicted traveling direction of the vehicle 10. Then, the processing unit 200 determines the change order, based on the predicted traveling direction of the vehicle 10. The processing unit 200 also determines whether to display the character 600 on the "right lower" or "left lower" of the displayable region 410, based on the current traveling direction or predicted traveling direction of the vehicle 10. For example, when the predicted traveling direction of the vehicle 10 is "to the right", the processing unit 200 displays the character 600 on the left lower. Then, the processing unit 200 causes the display image to change to the non-display state from the right to the left. On the other hand, when the predicted traveling direction of the vehicle 10 is "to the left", the processing unit 200 displays the character 600 on the right lower and causes the display image to change to the non-display state from the left to the right. In this way, the processing unit 200 determines the change order in order from the display region corresponding to the traveling direction of the vehicle 10 to the display region in the direction opposite to the traveling direction of the vehicle 10.

As another example, when it is determined that the change condition of "the fire-extinguishing vehicle is approaching" is satisfied, the processing unit 200 displays a fire cap wearing character on the right side of the displayable region 410 of the display device 11, irrespective of the traveling direction of the vehicle 10, and also displays a motion image as if the character yells. Then, the processing unit 200 causes the display image to change to the non-display state in order from the left to the right of the display region. The ECU 18 also moves the vehicle 10 to the left.

Note that, in addition to the change conditions shown in FIG. 8, a condition that a predetermined amount or larger of accelerator operation by the passenger 80 is detected, a condition that a braking release operation by the passenger 80 is detected during the stop of the vehicle 10, a condition that a predetermined amount or larger of steering operation by the passenger 80 is detected, a condition that a prescribed amount or larger of braking operation or steering operation may be performed during automatic driving, and the like may also be applied as the element of the change condition. The change to the non-display state may also be effected without displaying a character, depending on the change condition.

In this way, the non-display change information associates a change condition, a traveling direction of the vehicle 10, a change order, an image of a character, a motion image of the character and a display position each other in combination. The processing unit 200 refers to the non-display change information to determine the change order, the character image, the motion image, and the display position, based on the satisfied change condition and the traveling direction of the vehicle 10, causes the display device 11 to display the character image, and causes the display image to change to the non-display state according to the determined change order.

FIG. 9 shows a data structure of change rate information. The change rate information associates a vehicle speed and a change rate. In the "vehicle speed", information indicative of a speed of the vehicle 10 is stored. The "vehicle speed" may be a current speed of the vehicle 10. In the "change rate", information indicative of a rate of causing the display region to change to the non-display state is stored. The "change rate" is a value that is inversely proportional to time from a state in which a display image is displayed until the display image is not displayed, for example. In FIG. 9, a magnitude relation of the change rate is, for example, rate 1<rate 2<rate 3<rate 4. That is, the change rate information associates a higher change rate with a faster vehicle speed.

The processing unit 200 refers to the change rate information to determine a change rate of causing the display region to change to the non-display state, based on the vehicle speed of the vehicle 10. Thereby, the processing unit 200 can increase the change rate as the vehicle speed is faster. For this reason, as the vehicle speed becomes faster, it is possible to cause the display image to change more rapidly to the non-display state.

Figure 10:
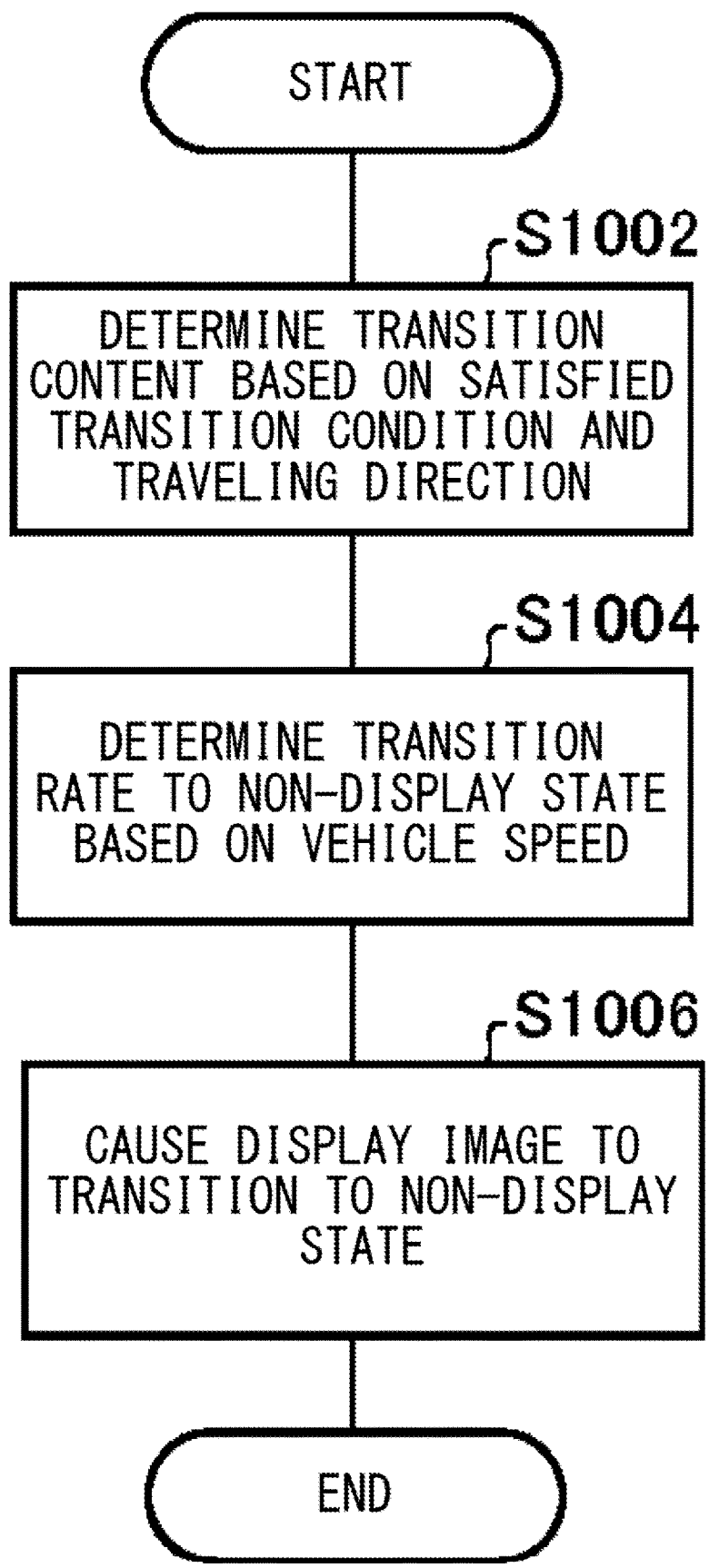
FIG. 10 shows a flowchart of a control method that is executed by the control device 14.

FIG. 10 shows a flowchart of a control method that is executed by the control device 14. In 51002, the processing unit 200 determines a change content to the non-display state, based on the satisfied change condition and the traveling direction of the vehicle 10. Specifically, the processing unit 200 refers to the non-display change information described in connection with FIG. 8 to determine a change order, an image of a character, a motion image of the character, and a display position, based on the satisfied change condition and the traveling direction of the vehicle 10.

Then, in 51004, the processing unit 200 determines a change rate based on a vehicle speed of the vehicle 10. Specifically, the processing unit 200 refers to the change rate information described in connection with FIG. 9 to determine a change rate. Then, in 51006, the processing unit 200 causes the display image to change to the non-display state, according to the change content and change rate determined in 51002 and 51004. Specifically, the processing unit 200 displays the image of the character and the motion image, based on the change content, thereby effecting the change to the non-display state.

As described above, according to the control device 14, when the predetermined condition of causing the display image to change is satisfied, it is possible to determine the regions that are caused to change to the non-display state and the change order, based on the traveling direction of the vehicle 10. Thereby, it is possible to cause the display region to change to the non-display state in appropriate order corresponding to the traveling direction of the vehicle 10.

Note that, the display device 11 is not limited to the HUD. As the display device 11, any display device that superimposes and displays an image on a scene visually recognized by the passenger 80 can be applied. For example, the display device 11 may be a head-mounted display (HMD). The display device 11 may also be any display device other than the HUD and the HMD. For example, the display device 11 may be a display device that forms an image in a three-dimensional space. As an example, the display device 11 may be an aerial display device that forms an image in the air by using retroreflection.

The vehicle 10 is an example of a transportation vehicle. The transportation vehicle may be an electric train, a ship, an airplane and the like, in addition to automobile such as a passenger car and a bus. The transportation vehicle is an example of a moving body. At least some of functions of the control device 14 may also be implemented by a server outside of the vehicle 10.

Figure 11:
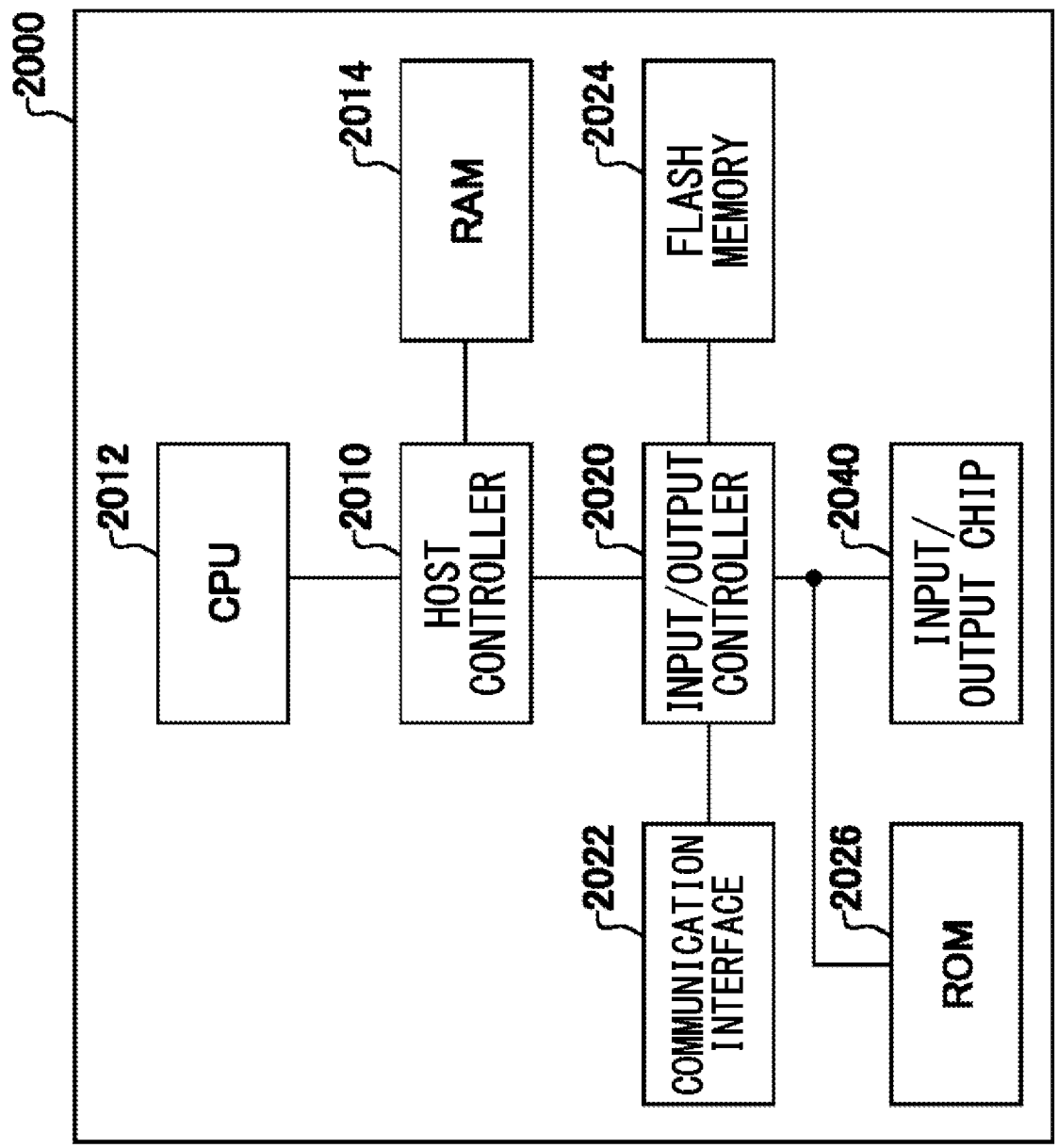
FIG. 11 shows an example of a computer 2000.

FIG. 11 shows an example of a computer 2000 in which a plurality of embodiments of the present invention can be entirely or partially embodied. A program that is installed in the computer 2000 can cause the computer 2000 to function as a device such as the control device 14 associated with the embodiment or as each unit of the device, cause the computer 2000 to perform operations associated with the device or each unit of the device, and/or cause the computer 2000 to perform the process associated with the embodiment or steps thereof. Such a program may be performed by a CPU 2012 so as to cause the computer 2000 to perform certain operations associated with some or all of blocks of processing procedures and block diagrams described herein.

The computer 2000 in accordance with the present embodiment includes a CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data that are used by the CPU 2012 within the computer 2000. The ROM 2026 stores therein a boot program or the like that is performed by the computer 2000 at the time of activation, and/or a program depending on the hardware of the computer 2000. The input/output chip 2040 may also connect various input/output units such as a keyboard, a mouse, a monitor and the like to the input/output controller 2020 via a serial port, a parallel port, a keyboard port, a mouse port, a monitor port, a USB port, an HDMI (registered trademark) and the like.

A program is provided by a computer-readable medium such as a CD-ROM, a DVD-ROM or a memory card or via a network. The RAM 2014, the ROM 2026, or the flash memory 2024 is an example of the computer-readable medium. The program is installed in the flash memory 2024, the RAM 2014 or the ROM 2026, and is performed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may perform a communication program loaded onto the RAM 2014 to instruct communication processing to the communication interface 2022, based on the processing described in the communication program. The communication interface 2022, under control of the CPU 2012, reads transmission data stored on a transmission buffer processing region provided in a recording medium such as the RAM 2014 and the flash memory 2024, transmits the read transmission data to the network, and writes reception data received from the network into a reception buffer processing region or the like provided on the recording medium.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 then writes back the processed data to the recording medium.

Various types of information, such as various types of programs, data, tables and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described throughout the present specification and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, is stored in the recording medium, the CPU 2012 may search for an entry matching the condition whose attribute value of the first attribute is designated, from the plurality of entries, and read the attribute value of the second attribute stored in the entry, thereby acquiring the attribute value of the second attribute associated with the first attribute satisfying the predetermined condition.

The above-explained program or software modules may be stored in the computer-readable medium on or near the computer 2000. A recording medium such as a hard disk or a RAM provided in a server system connected to a dedicated communication network or the Internet can be used as the computer-readable medium. The program stored in the computer-readable medium may also be provided to the computer 2000 via the network.

The programs that are installed in the computer 2000 and cause the computer 2000 to function as the control device 14 may act to the CPU 2012 and the like, thereby causing the computer 2000 to function as each unit of the control device 14. The information processing described in the programs are read into the computer 2000 to function as each unit of the control device 14 that is a specific means in which software and the diverse types of hardware resources cooperate with each other. The specific means implements calculation or processing of information according to a use purpose of the computer 2000 of the present embodiment, so that the control device 14 is established according to the use purpose.

The diverse embodiments have been described with reference to the block diagrams and the like. The blocks in the block diagram may each represent (1) steps of processes in which operations are performed or (2) units of apparatuses responsible for performing operations. Certain steps and units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein configures at least a part of an article of manufacture including instructions which can be executed to fetch means for performing operations specified in the processing procedures or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages such as "C" programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to fetch means for performing operations specified in the described processing procedures or block diagrams. Examples of the processor include a computer processor, a processing unit, a microprocessor, a digital signal processor, a controller, a microcontroller, and the like.

While the present invention has been described using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: vehicle
11: display device
12: HUD device
13: reflection part
14: control device
16: sensor
18: ECU
19: windshield
80: passenger
100: display image
110: arrow
200: processing unit
280: recording unit
292: microphone
294: camera
400: display region
410: displayable region
500, 510, 520: display image, 530: display image
600: character
610, 620, 630: display image
611: motion image, 621: motion image, 631: motion image
700: character
710, 720, 730: display image
711, 721, 731: motion image 2000: computer
2010: host controller
2012: CPU
2014: RAM
2020: input/output controller
2022: communication interface
2024: flash memory
2026: ROM
2040: input/output chip

What is claimed is:

1. A control device for controlling a display device capable of displaying visual information for a passenger onto a windshield of a moving body, in two or more display regions, wherein
when adjacent target regions of the two or more display regions are in a display state in which the visual information is being displayed, the control device causes the adjacent target regions to be in a non-display state in which the visual information for the passenger is not displayed in a predetermined order, when a predetermined condition is satisfied, and
the control device is configured to determine the target regions and the order, based on a traveling direction of the moving body at the time when the condition is satisfied or a predicted traveling direction of the moving body after the time when the condition is satisfied;
wherein
the order corresponds to, a direction opposite to, the traveling direction of the moving body at the time when the condition is satisfied or the predicted traveling direction of the moving body after the time when the condition is satisfied.

2. The control device according to claim 1, comprising a recording unit for recording character images associated with each of a plurality of combinations of the target regions and the order, wherein
the control device is configured to acquire, from the recording unit, the character image associated with a combination of the determined target regions and order, and cause the display device to display the character image.

3. The control device according to claim 2, wherein
the recording unit is configured to record display positions of the character images associated with each of the plurality of combinations, and
the control device is configured to acquire, from the recording unit, a display position of the character image associated with the combination of the determined target regions and order, and display the character image at a display position, which is associated with the combination of the determined target region and order, of the display device.

4. The control device according to claim 3, wherein
the display position of the character image associated with the combination of the determined target regions and order is located outside of the adjacent target regions.

5. The control device according to claim 2, wherein
the recording unit is configured to record motion images of characters associated with each of the plurality of combinations, and
the control device is configured to acquire, from the recording unit, a motion image of the character associated with a combination of the determined target regions and order, and cause the display device to display the motion image of the character.

6. The control device according to claim 1, comprising a recording unit for recording character images associated with each of a plurality of the conditions, wherein
the control device is configured to acquire, from the recording unit, the character image associated with the satisfied condition, and cause the display device to display the character image.

7. The control device according to claim 1, wherein
the control device is configured to determine a change rate from the display state to the non-display state, based on a speed of the moving body.

8. The control device according to claim 1, wherein
the control device is configured to increase a change rate from the display state to the non-display state as a speed of the moving body is faster.

9. The control device according to claim 1, wherein
when the moving body is traveling straight at a higher speed than a predetermined speed, the control device is configured to determine the order in order from an upper display region to a lower display region with respect to a surface on which the moving body moves.

10. The control device according to claim 1, wherein
the condition includes change of the moving body from a stop state to a moving state.

11. The control device according to claim 1, wherein
the moving body can drive automatically, and the condition includes lowering in automatic driving level.

12. The control device according to claim 1, wherein
the control device is configured to superimpose and display the information on a scene that is visually recognized by the passenger.

13. The control device according to claim 12, wherein
the display device is a head up display.

14. A vehicle comprising the control device according to claim 1.

15. A non-transitory computer-readable storage medium having a program stored thereon for causing a computer to control a display device capable of displaying visual information for a passenger onto a windshield of a moving body, in two or more display regions, the program being for
causing, when adjacent target regions of the two or more display regions are in a display state in which the visual information is being displayed, the adjacent target regions to be in a non-display state in which the visual information for the passenger is not displayed according to a predetermined order, when a predetermined condition is satisfied, and
determining the target regions and the order, based on a traveling direction of the moving body at the time when the condition is satisfied or a predicted traveling direction of the moving body after the time when the condition is satisfied;
wherein
the order corresponds to, a direction opposite to, the traveling direction of the moving body at the time when the condition is satisfied or the predicted traveling direction of the moving body after the time when the condition is satisfied.

16. A method of controlling a display device capable of displaying visual information for a passenger onto a windshield of a moving body, in two or more display regions, the method comprising:
causing, when adjacent target regions of the two or more display regions are in a display state in which the visual information is being displayed, the adjacent target regions to be in a non-display state in which the visual information for the passenger is not displayed according to a predetermined order, when a predetermined condition is satisfied; and determining the target regions and the order, based on a traveling direction of the moving body at the time when the condition is satisfied or a predicted traveling direction of the moving body after the time when the condition is satisfied;

wherein the order corresponds to, a direction opposite to, the traveling direction of the moving body at the time when the condition is satisfied or the predicted traveling direction of the moving body after the time when the condition is satisfied.

17. A control device for controlling a display device capable of displaying visual information for a passenger of a moving body, in two or more display regions, wherein the control device is configured to cause adjacent target regions of the display regions to change from a display state in which the information is displayed to a display restricted state in which display is restricted, in a predetermined order, when a predetermined condition is satisfied, the control device is configured to determine the target regions and the order, based on a traveling direction of the moving body at the time when the condition is satisfied or a predicted traveling direction of the moving body after the time when the condition is satisfied, and when the moving body is traveling straight at a higher speed than a predetermined speed, the control device is configured to determine the order in order from an upper display region to a lower display region with respect to a surface on which the moving body moves.

* * * * *